United States Patent
Michaels

(10) Patent No.: US 8,544,364 B2
(45) Date of Patent: Oct. 1, 2013

(54) POWER CABLE JACKET TEARING TOOL

(76) Inventor: A. Larry Michaels, Salem, OR (US)

(*) Notice: Subject to any disclaimer, the term of this patent is extended or adjusted under 35 U.S.C. 154(b) by 238 days.

(21) Appl. No.: 13/200,635

(22) Filed: Sep. 26, 2011

(65) Prior Publication Data

US 2013/0074656 A1 Mar. 28, 2013

(51) Int. Cl.
*H02G 1/12* (2006.01)

(52) U.S. Cl.
USPC .............................. 81/9.4; 81/9.51

(58) Field of Classification Search
USPC ............. 81/9.4, 9.51; 29/564.4, 426.2, 426.3
See application file for complete search history.

(56) References Cited

U.S. PATENT DOCUMENTS

| 4,704,925 | A | * | 11/1987 | Sutton | 81/9.4 |
| 5,230,260 | A | * | 7/1993 | Bell | 81/9.4 |
| 7,228,763 | B2 | * | 6/2007 | Hughes et al. | 81/9.51 |

OTHER PUBLICATIONS

"Remarkable New Jacket Removal Tool!", p. 11 of Handline magazine, authored by the staff of Northwest Lineman College, dated Fall 2009.

* cited by examiner

*Primary Examiner* — David B Thomas
(74) *Attorney, Agent, or Firm* — Portland Intellectual Property, LLC

(57) ABSTRACT

A power cable jacket tearing tool. A first tool body portion has a first aperture for receiving the cable therethrough, and a second tool body portion has a second aperture for receiving the cable therethrough. The first and second tool body portions are rotatably connected to one another to form a joint allowing each tool body portion to rotate relative to the other about a pivot axis that passes through the first and second apertures. The second tool body portion supports a rotatable spool for receiving and spooling the end of a selected conductor of the cable. The tool also includes a motor for driving the spool, a power source for powering the motor, and a control mechanism for controllably coupling the power source to the motor. The motor is carried by the second tool body portion, whereas the control mechanism is carried by the first tool body portion.

20 Claims, 6 Drawing Sheets

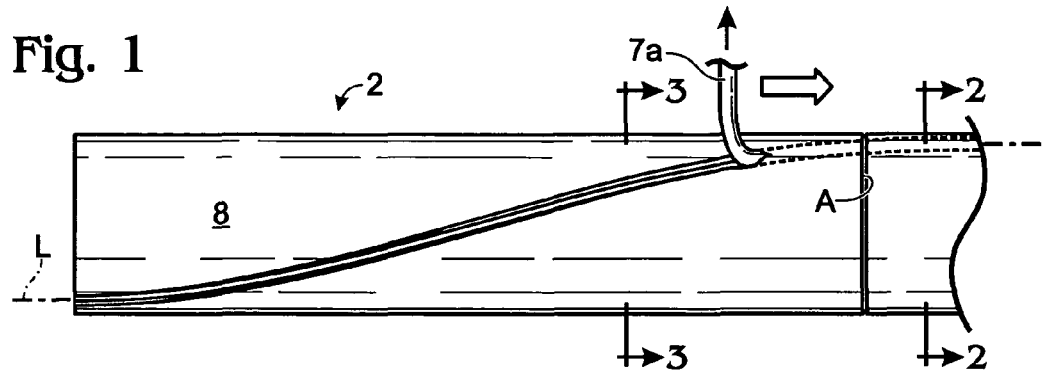
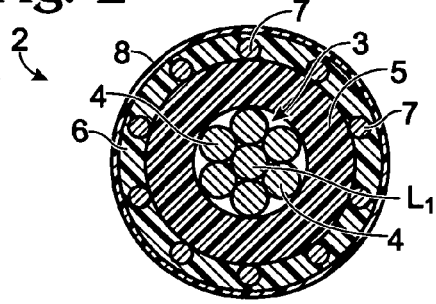
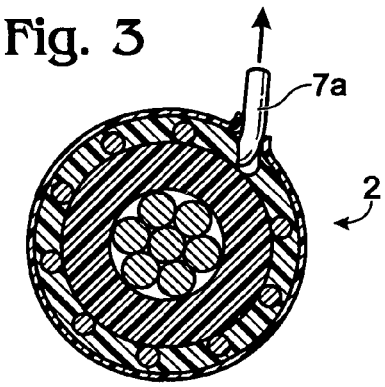
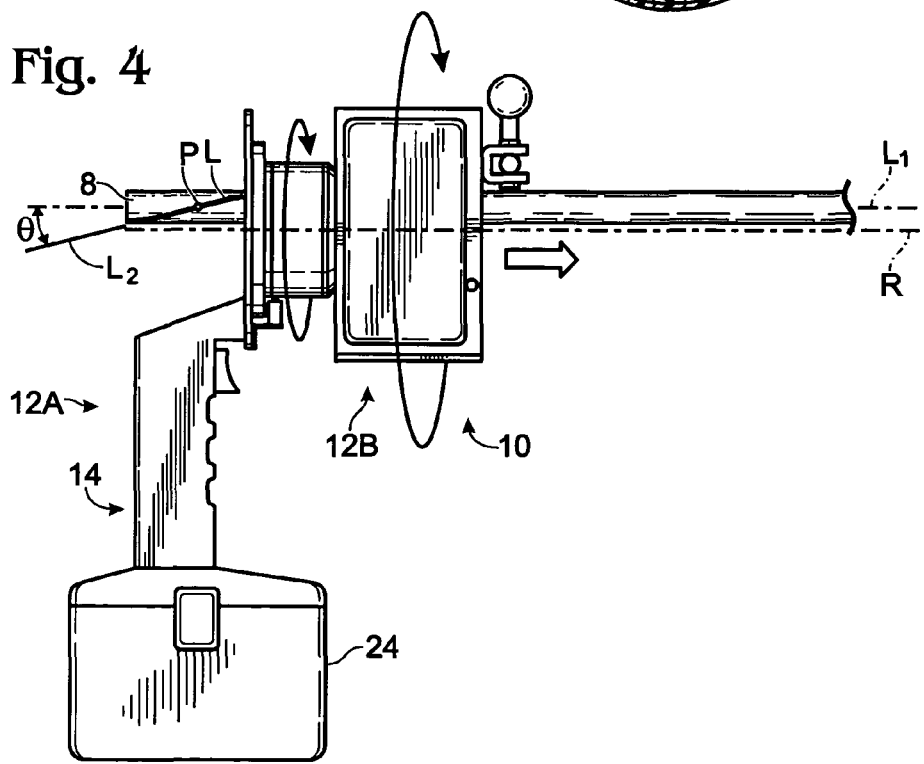

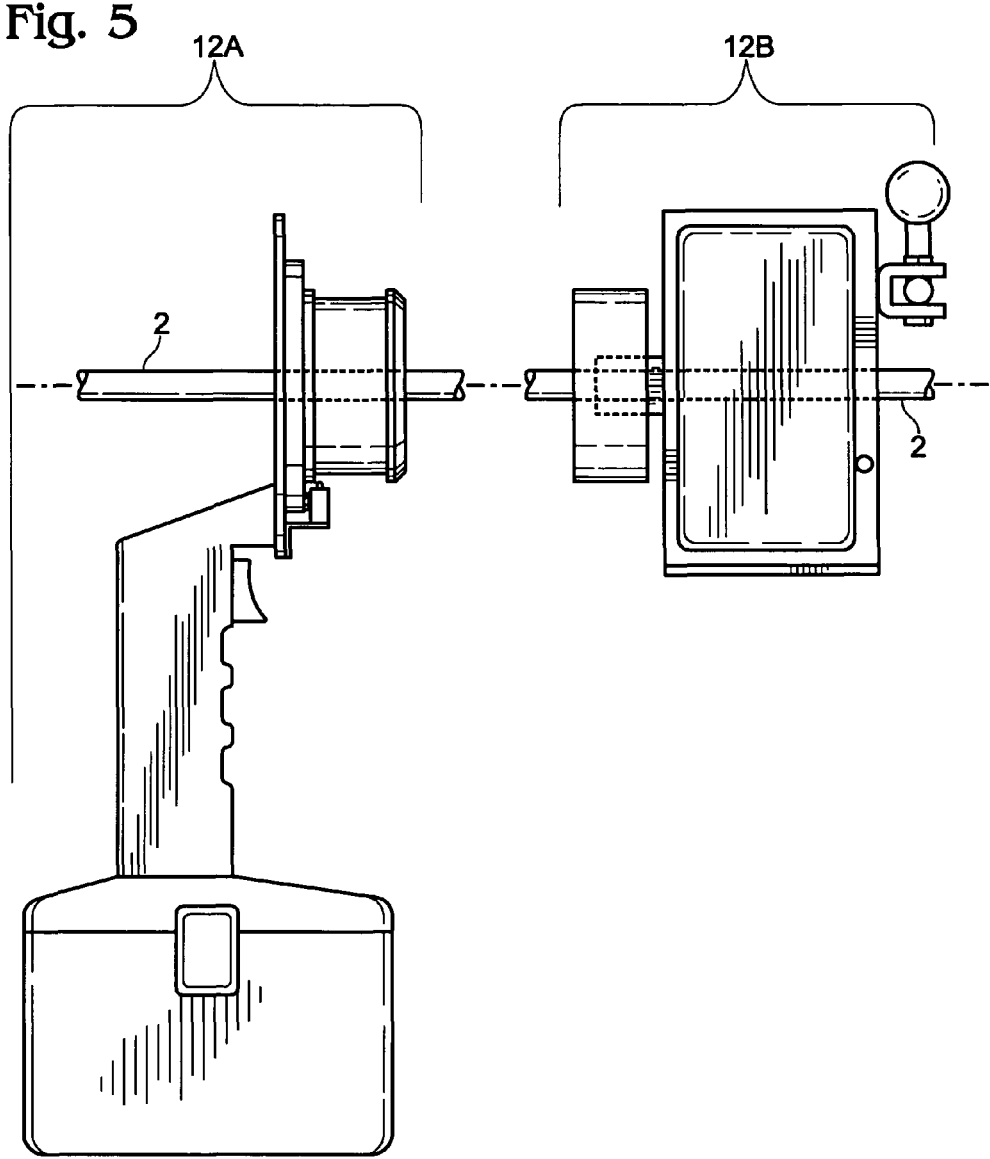

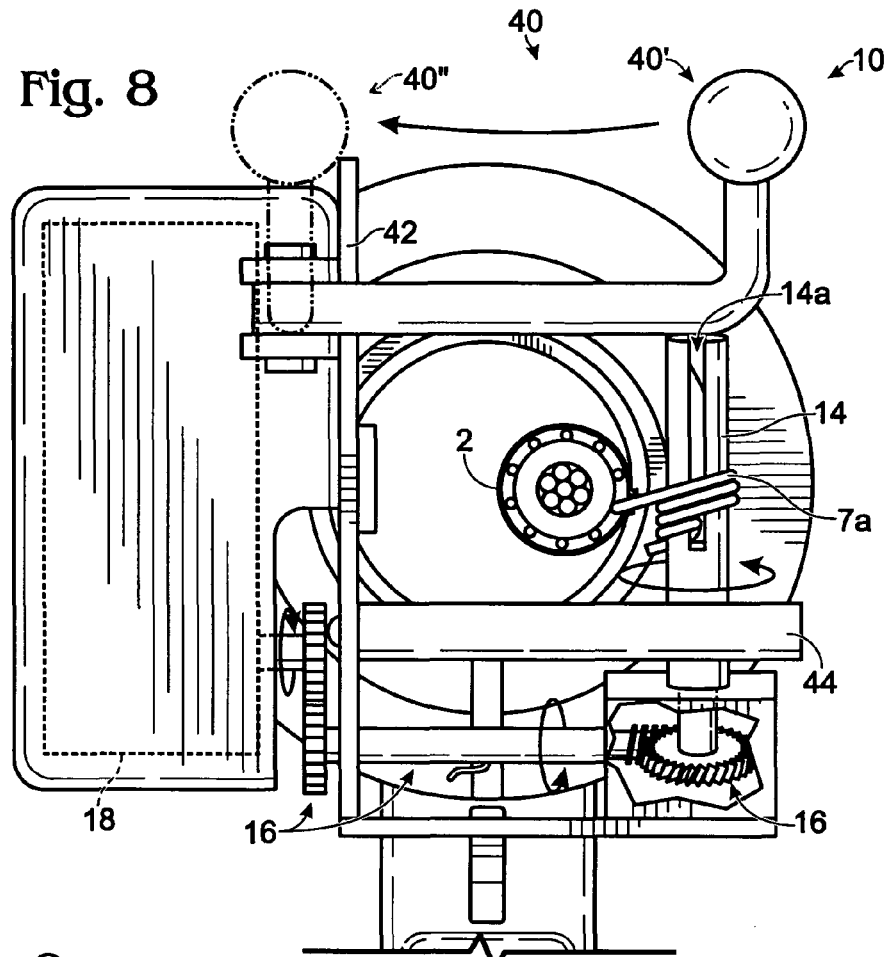
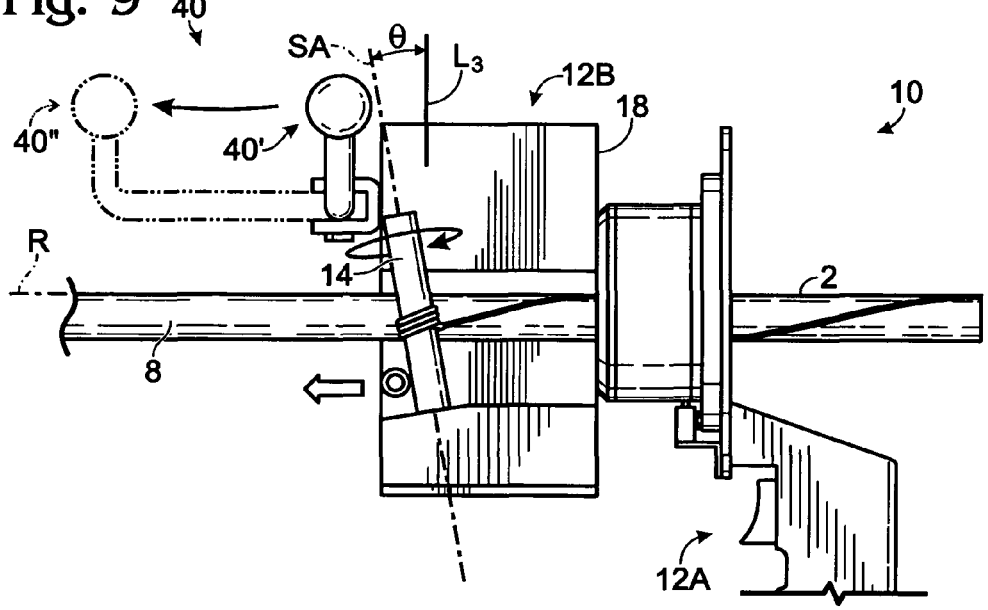

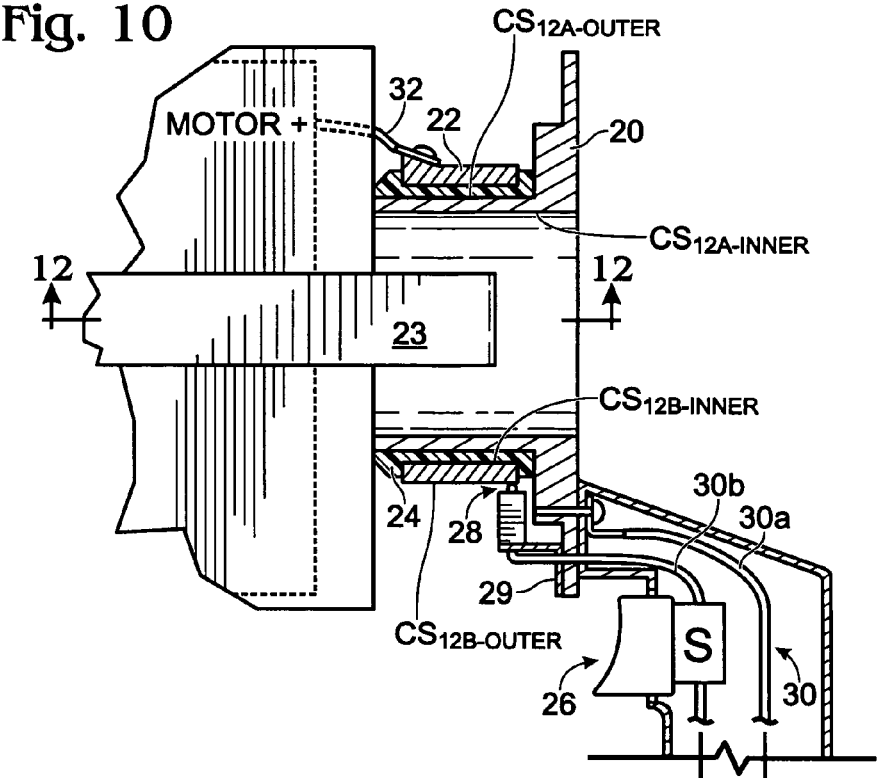
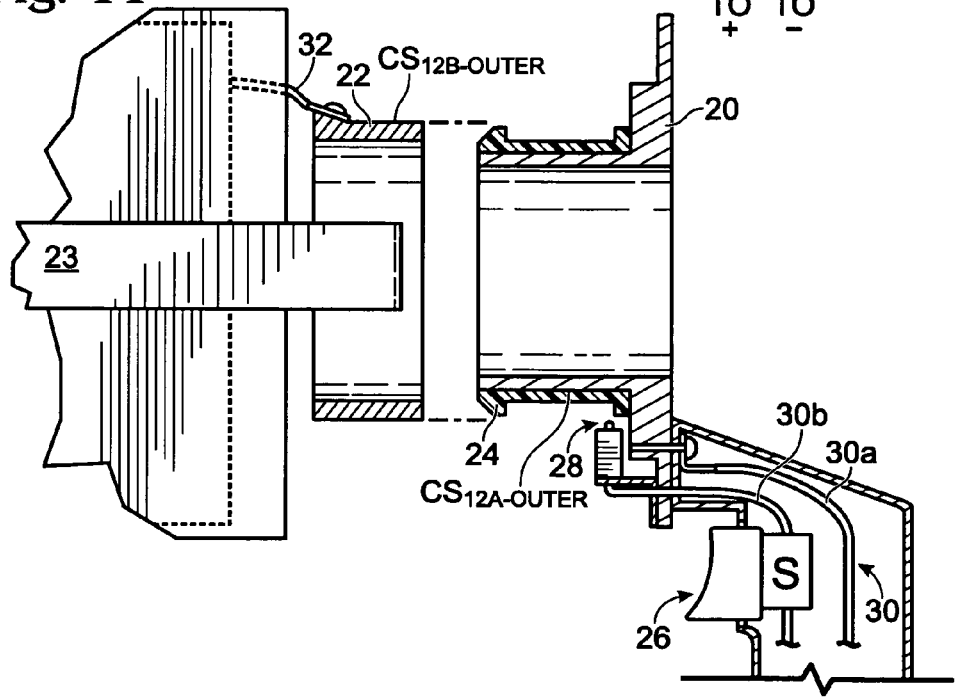

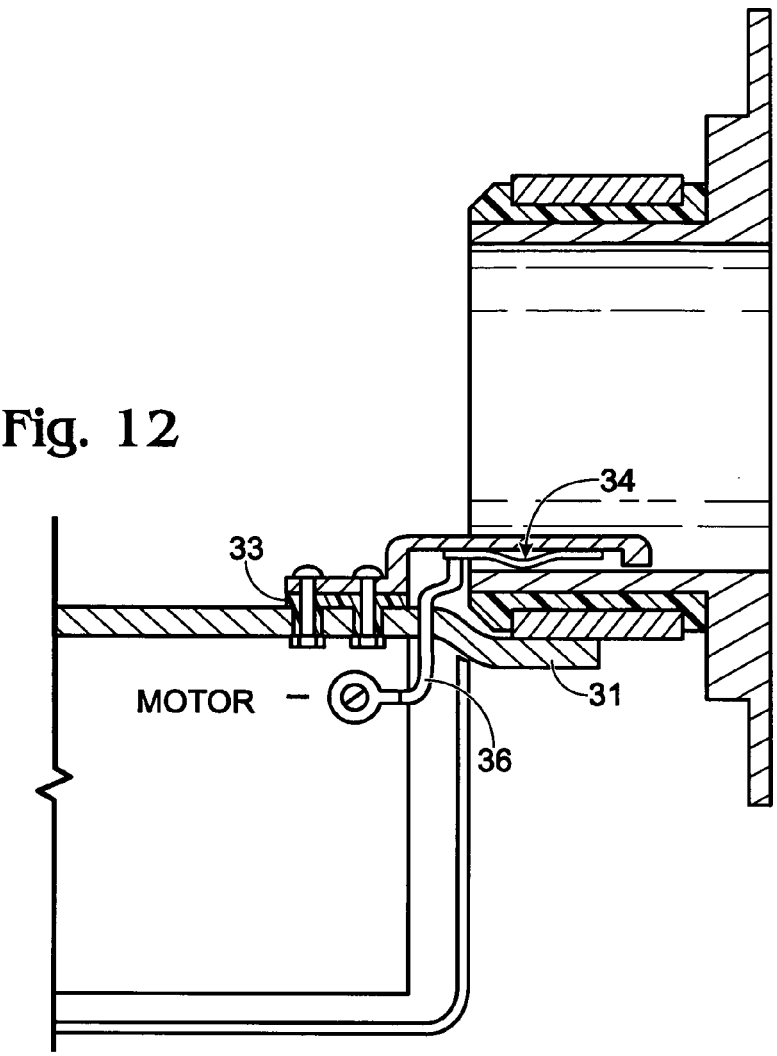

POWER CABLE JACKET TEARING TOOL

FIELD OF THE INVENTION

The present invention relates to a power cable jacket tearing tool, for tearing the outer jacket of a power cable, particularly a power cable for serving relatively high power loads, such as an electric utility power cable, so that the jacket can be stripped away from the conductors carried within the cable to allow access thereto.

BACKGROUND

Power cables typically have at least the following three major components: (1) one or more power-transmitting conductors; (2) a sheath of electrical insulation surrounding each of the power transmitting conductors; and (3) an insulating and mechanically protective outer jacket.

Each conductor is formed of either a single strand or multiple strands of metal wire, typically copper or aluminum. The conductors are, and the cable is, flexible to a degree, and illustrative of this fact is that the cable is typically provided wound onto a reel. However, higher currents require thicker, and therefore stiffer, conductors, and higher voltages require thicker, and therefore stiffer, insulation. For transmitting large amounts of electrical power, all of the components of the power cable, including the outer jacket, are thicker and stiffer, making the cable difficult for an electrical worker to manipulate.

Aside from running or laying the power cable, the primary requirement for manipulating a power cable is to terminate it, for connecting it to a junction box, or to a load. This requires stripping away the outer jacket at the end to be terminated, to expose the conductor(s).

This operation may be explained with reference to FIGS. 1-3, which show a typical electric utility power cable referenced as 2. FIGS. 2 and 3 show the cable in cross-section. To provide an indication of scale, the cable may be 1-2 ½" in diameter.

With particular reference to FIG. 2, the cable 2 has a central conductor 3 formed of seven strands 4 of wire. The conductor 3 is surrounded by a layer of electrical insulation 5. The insulation 5 is in turn surrounded by a support layer 6 that mechanically supports and electrically isolates from one another a number of (e.g., 10) individual conductors 7. Finally, surrounding the support layer 6, is the outer jacket, referenced as 8.

With reference to FIGS. 1 and 3, to tear the jacket a particular one of the conductors 7, e.g., the conductor 7a indicated, is selected, gripped by a gripping tool such as a pair of pliers, and pulled through the jacket 8, creating a generally longitudinally running tear-line "L." Once the jacket is torn longitudinally, it can be cut or scored circumferentially at the desired position, such as at the position "A" indicated in FIG. 1, and removed with little additional effort.

As for the strands 4 of the conductor 3, the conductors 7 are helically or spirally wound along the cable, so that the line "L," which is generally longitudinally running as just mentioned, tends to circle the cable as well. This circling causes a problem for the electrical utility worker. While it would take a significant effort to pull the conductor 7a through the jacket along a straight line, the fact that the line "L" tends to circle around the cable as well makes this pulling particularly awkward, because the worker's hands must also tend to circle the cable as he or she is pulling. This is particularly hard on the worker's wrists, often resulting in injuries such as carpel tunnel syndrome.

It is an objective of the present invention to minimize or eliminate this difficulty.

SUMMARY

A power cable jacket tearing tool is disclosed herein. A preferred embodiment includes a first tool body portion having a first aperture for receiving the cable therethrough, and a second tool body portion having a second aperture, also for receiving the cable therethrough. The first and second tool body portions are rotatably connected to one another to form a joint allowing each tool body portion to rotate relative to the other about a pivot axis that passes through the first and second apertures. The second tool body portion supports a rotatable spool defining a spooling axis of rotation, the spool for receiving and spooling the end of a selected conductor of the cable. The tool also includes a motor and associated mechanical power transmission system for driving the spool, a power source for powering the motor, and a control mechanism for controllably coupling the power source to the motor. The motor and mechanical power transmission system are carried by the second tool body portion, whereas the control mechanism is carried by the first tool body portion.

Preferably, in all embodiments, the first aperture has a maximum projected area along a first aperture axis, the second aperture has a maximum projected area along a second aperture axis, and the first aperture axis, the second aperture axis, and the pivot axis are all substantially coincident.

Preferably, the motor is an electric motor, so the power source is a source of electricity and the control mechanism includes an electric switch, and the tool further includes an electrical power transmission system for transmitting electrical power, from the power source, between the first tool body portion and the second tool body portion, through the joint.

The electrical power transmission system is preferably adapted to make electrical contact between the first and second tool body portions by friction between either or both (a) respective electrically conductive portions of the first and second tool body portions, or (b) respective electrically conductive elements attached to the first and second tool body portions.

Where the motor is powered by electricity, the power source is preferably carried by the first tool body portion.

Preferably, the spooling axis is angled between about 10 and 20 degrees relative to a plane perpendicular to the pivot axis.

Preferably, the joint allows for relative rotation of the first and second tool body portions exceeding 360 degrees.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 1 is a side elevation of a typical electric utility power cable, showing a conductor therein being pulled through the outer jacket thereof, according to standard practice.

FIG. 2 is the cross-section indicated in FIG. 1 as 2-2.

FIG. 3 is the cross-section indicated in FIG. 1 as 3-3.

FIG. 4 is a side elevation of a preferred power cable stripping tool according to the present invention, shown tearing the jacket of a power cable such as that of FIGS. 1-3.

FIG. 5 is a partially exploded side elevation of the power cable jacket tearing tool of FIG. 4.

FIG. 8 is a partial bottom end view of the power cable jacket tearing tool of FIG. 4.

FIG. 9 is a partial side elevation of the power cable jacket tearing tool of FIG. 4.

FIG. 10 is a cross-section through the power cable jacket tearing tool of FIG. 5, taken along the line 10-10 thereof.

FIG. 11 is a partially exploded view of the cross-section shown in FIG. 10.

FIG. 12 is a cross-section through the power cable jacket tearing tool as shown in FIG. 10, taken along the line 12-12 thereof.

DETAILED DESCRIPTION OF PREFERRED EMBODIMENTS

Figure 7:
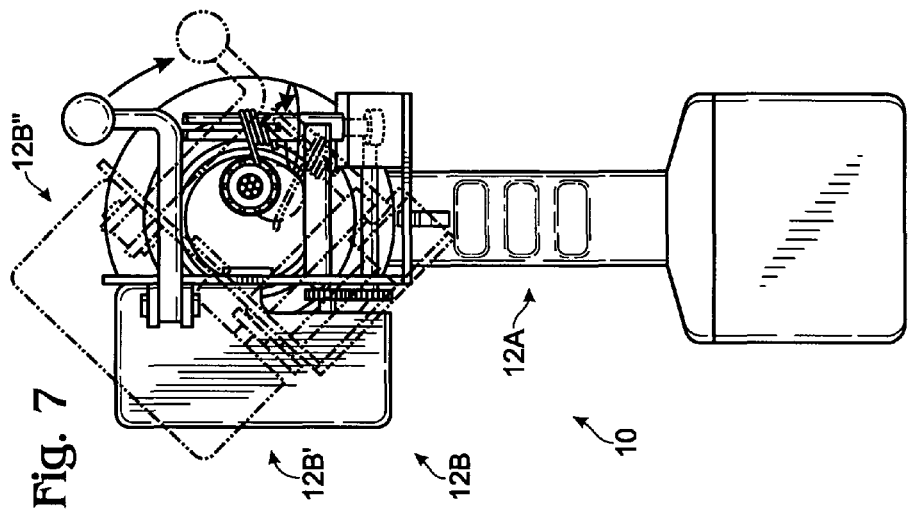
FIG. 7 is a bottom end view of the power cable jacket tearing tool of FIG. 4.
Figure 6:
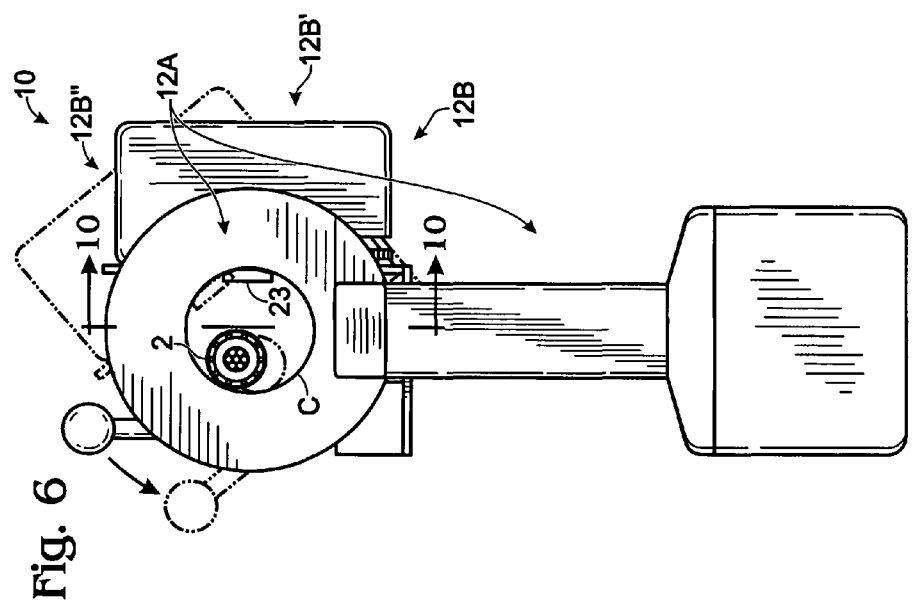
FIG. 6 is a top end view of the power cable jacket tearing tool of FIG. 4.

FIGS. 4-10 show a preferred power cable jacket tearing tool 10 according to the present invention. Referring particularly to FIG. 4, the jacket tearing tool 10 includes two tool body portions, specifically tool body components 12 as shown, namely 12A and 12B. The aforedescribed power cable 2 passes through both tool body components, as best seen with additional reference to FIGS. 6 and 7, showing the tool 10 and cable 2 in end views.

Returning to FIG. 4, the tool body components 12 are capable of rotating relative to each other, as will be explained in detail further below. Particularly, as indicated in FIG. 4, the body component 12B can rotate around the cable such as indicated by the solid arrows while the body component 12A is held stationary. Thus, a user of the tool 10 may grasp the tool 10 by use of the handle 14 of the tool body component 12A, and, for reasons explained in detail further below, the body component 12B translates in the direction of the open arrow as a result of the indicated rotation.

More particularly, the two tool body components are free to rotate relative to each other about a pivot axis of rotation "R" which passes through the center of the circle indicated as "C" in FIG. 6.

FIG. 5 shows the two tool body components exploded apart from one another. This is to better show that the aforedescribed cable 2 extends through respective apertures "A," namely "$A_{12A}$" and "$A_{12B}$" in the tool body components 12. These apertures will be identified more particularly further below.

Each aperture A is oriented so as to project a maximum aperture area along a, preferably, shared aperture axis (not shown) which is, preferably, coincident with the pivot axis R. In other words, the tool body components 12A and 12B rotate relative to one another about a pivot axis which extends centrally through both apertures A, and perpendicular to the planes defined by the aperture openings. However, none of these conditions is essential.

In FIGS. 6 and 7, the tool body component 12B is shown in two different positions relative to the body component 12A, which is assumed to be spatially fixed. In a first position the body portion 12B is shown in solid lines, the position being indicated by the reference 12B', and in a second position that is rotated about 45 degrees (counterclockwise in FIG. 6; clockwise in FIG. 7), the body component 12B is shown in phantom lines, the position being indicated by the reference 12B". FIGS. 4, 6 and 7 all illustrate that the body component 12B circles around the cable 2, and FIG. 4 illustrates that, as it circles, the tool 10 translates generally along the pivot axis R relative to the cable. FIGS. 8 and 9 show the cause of this translation.

With particular reference to FIG. 9, the two tool body components 12A and 12B are shown in a view comparable to that of FIG. 4. The body component 12B carries a spindle or spool 14. With additional reference to FIG. 8, this spool is connected through a mechanical power transmission system 16 to, preferably, an electric motor 18 (indicated schematically). Both the transmission system 16 and the motor 18 are also onboard the component 12B. The transmission system 16 enables the motor 18 to turn the spool 14 about a spooling axis "SA" (FIG. 8).

As shown in FIG. 8, the spool 14 has a slot 14a. This slot is provided to receive and hold the end of the selected conductor 7a (see FIGS. 1 and 3). The end of the conductor 7a being captured in the slot S, the conductor 7a becomes wound around the spool 14 as the spool turns.

Turning back to FIG. 9, this winding of the conductor 7a both (a) tears the conductor through the jacket 8 of the cable, creating the tear-line "L," and (b) pulls the tool 10 along the cable 2 in the direction of the open arrow.

Further, because the conductor 7a is helically wound along the length of the cable 2, the spool 14, and therefore the body portion 12B which carries it, must also circle around the cable 2, as indicated in FIG. 4, as the tool 10 translates in the direction of the open arrow.

As shown, the component 12B was required to make more than one complete circle around the cable. To allow for this without requiring the user to rotate the tool body component 12A at all, so that the user can avoid having to follow the tool 10 around the cable to any degree, the tool body components 12A and 12B are preferably permitted to rotate relative to one another more than 360 degrees. However, it may not be necessary or desirable to tear the jacket so far as is illustrated, in which case this degree of rotational capability may not be needed even in preferred embodiments of the invention.

The mechanical power transmission system 16, including the shafts and gears as shown in FIG. 8, is considered sufficiently straightforward that it need not be explained beyond providing the illustration. Likewise, it will be readily appreciated by persons of ordinary mechanical skill that alternative arrangements and components could be utilized to perform the same function. For example, the mechanical power transmission system could be the spool itself, as a simple extension of the shaft of the motor, with no gears or additional mechanical parts being employed.

FIGS. 10-12 show in more detail the joint between the two tool body components 12A and 12B. FIG. 10 shows this joint in cross-section, and FIG. 11 shows the joint exploded between the two tool body portions 12, so that it is clear which elements of the joint as shown in FIG. 10 belong to which of the body portions.

With particular reference to FIG. 10, the body component 12A includes a flange 20 which is also seen in FIG. 6. It may now be appreciated that the circle "C" in FIG. 6 is one end of a cylindrical inner surface "$CS_{12A\text{-}INNER}$" (FIG. 6) that defines the aforementioned aperture $A_{12A}$. The flange 20 also defines a cylindrical outer surface, "$CS_{12A\text{-}OUTER}$."

The body component 12B includes an electrically conductive, typically metal, collar 22 that defines a cylindrical inner surface "$CS_{12B\text{-}INNER}$" that defines the aforementioned aperture $A_{12B}$. The collar 22 also defines a cylindrical outer surface "$CS_{12B\text{-}OUTER}$."

Disposed between the collar 22 of the body component 12B and the flange 20 of the body component 12A is an electrically insulating bearing ring 24. This may be formed of "ultra-high-molecular-weight" ("UHMW") polyethylene, which provides for a low coefficient of friction and high lubricity. As shown, the bearing 24 preferably has a groove to receive the collar 22.

It has been found that it is sufficient to utilize the joint between the flange 20, collar 22, and bearing 24, as the sole means for supporting the body component 12B relative to the body component 12A, i.e., the body component 12B, which is cantilevered from the body component 12A (the cantilever support being provided by cooperation of the flange 20, collar 22, and a support member 31 of the tool body component 12B referenced in FIGS. 6, 10 and 12), can be securely supported in this manner during use of the tool 10 by a user who holds onto only the body component 12A. It will be readily appreciated by persons of ordinary mechanical skill that providing a wider, rather than a narrower, collar 22 helps in this regard. It will also be readily appreciated that it is helpful to provide a closer, rather than a looser, fit between the outside surface $CS_{12A\text{-}OUTSIDE}$ of the flange 20, the surface $CS_{12B}$ of the collar 22, and the bearing 24, to minimize play in the joint.

The joint thus described is also utilized to transmit electrical power to the motor 18. That is, in the preferred stripping tool 10, the power source for powering the motor 18 onboard the tool body component 12B is a battery pack 24 (see, e.g., FIG. 4) onboard the tool body component 12A. The battery pack is typically provided in the form of a plurality of replaceable lithium or nickel cadmium batteries or cells connected together so as to obtain the voltage appropriate for powering the motor 18.

Also provided onboard the tool body component 12A is a control mechanism 26 for remotely controlling the motor 18 onboard the tool body component 12B. In the preferred tool 10, the control mechanism 26 is a switch for controlling the transmission of power from the battery pack 24 to the motor 18. While it is somewhat desirable, from the standpoint of weight distribution in the tool 10, to carry the battery pack on the tool body component 12A, it is extremely advantageous to provide the switch on the body component 12A to allow the user to obtain control of the transmission of power to the tool 10 through hold of the component 12A. For such case, an electrical transmission system for transmitting electrical power between the two components is provided.

In the preferred such case where the battery pack is onboard the tool body component 12A, the electrical power transmission system provides both a positive and a negative electrical connection between the two body components. These connections are made through rotating parts; particularly, through the flange 20 and collar 22.

Like the collar 22, the flange 20 is electrically conductive and is typically formed of metal. A pair of conductors 30, namely 30a and 30b, are shown in FIG. 10 for connecting the positive and negative terminals of the battery pack 24 (not shown in this Figure) to the flange 20. The polarity may be reversed, but in this example the negative lead is connected directly to the flange 20, and the positive lead is connected, through the aforementioned switch 26, to a positive lead brush 28 which is spring-biased against the outer surface $CS_{12B\text{-}OUTER}$ of the collar 22 (of the tool body component 12B). As shown, the brush 28 is carried by the flange 20, connected through an electrically insulated bracket 29.

The collar 22 rotates with the motor 18 and so a conductor 32 may be applied directly across the collar 22 and the positive terminal of the motor 18, to complete the electrical connection from the positive terminal of the battery pack 24 to the positive terminal of the motor 18.

Now with reference to FIG. 12, the tool body component 12B carries a negative lead brush 34 which is spring-biased against the inner surface $CS_{12A\text{-}INNER}$ of the flange 20 (of the tool body component 12A). The negative lead brush 34 is connected via a conductor 36 to the negative terminal of the motor 18, to complete the electrical connection from the negative terminal of the battery pack 24 to the negative terminal of the motor 18. As shown, the brush 34 is carried by an electrically insulated bracket 31 attached to the collar 22, the bracket being insulated by use of an insulator 33.

It may now be appreciated that, while it will ordinarily be preferable from a manufacturing stand-point that the flange 20 and collar 22 are electrically conductive in their entireties, it is only necessary that these parts are electrically conductive where they make contact with the brushes 28 and 34.

It is to be understood that the term "brush" is used to refer broadly to any element or combination of elements that pass electric current through frictional contact.

Returning to FIG. 4, the cable 2 defines a central, longitudinal axis "$L_1$" which passes through the center of the cable as indicated in FIG. 2. This axis is roughly, but not precisely, aligned with the pivot axis R. It will be noted then that the tear-line L (see also FIG. 1) defines a helical angle θ, relative to the pivot axis R, which can be discerned from any particular vantage point (such as that defined by FIG. 4) at a point "P" on the jacket 8 which lies on a straight line passing through the axis $L_1$ and extending (or projecting) so as to meet the eye. This angle defines a line "$L_2$" which represents the optimum pulling axis for pulling on the conductor 7a for stripping the cable, i.e., substantially perpendicular to the tear-line L.

Returning to FIG. 9, it is a desirable, but not essential, feature of the tool 10 that the spool 14 is inclined by approximately the same angle θ, relative to a line "$L_3$" which is perpendicular to the pivot axis R, to provide for pulling the conductor 7a substantially along the optimum pulling axis. Since the angle θ is defined by the cable, it will vary accordingly; however, because the helical angle in electrical utility power cables is sufficiently standardized, and because deviations from the optimum pulling axis are not so critical, providing for θ in the range of 10 and 20 degrees provides good results.

Also in FIGS. 8 and 9 it will be noted that the tool 10 preferably includes a guide 40. The guide 40 is adapted to pivot between the position shown in solid lines, referenced as 40', and the position shown in phantom lines, referenced as 40", and to be lockable in the former position such as by use of a detent mechanism. The guide, when in the position referenced as 40', cooperates with the spindle 24 and static frame elements 42 and 44 (FIG. 9) to confine the cable 2 downstream of the apertures A, to minimize pitching of the tool 10. The guide is adapted for opening into the position referenced as 40" to facilitate inserting the cable through the tool.

Providing for controlling the motor 18, onboard the second tool body component, by use of a control mechanism 26 onboard the first tool body component, provides the outstanding advantage of allowing the user to avoid following the rotation of the second tool body portion around the cable, thereby avoiding stress to hands, wrists, elbows and shoulders to which the user would otherwise be exposed.

It is to be understood that, while specific detailed configurations have been shown and described as being preferred, other configurations could be used without departing from the principles of the invention. In this regard, it should be noted that it is possible to utilize a non-electric motor, such as a small gasoline engine, for powering a power cable stripping tool within the principles of the invention, in which case the control mechanism could be a flexible cable adapted to be twisted sufficiently to permit commercially useful degrees of rotation of the second tool body component relative to the first. Such a cable could pass through the rotatable joint between the two tool body portions, or not.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A cable stripping tool, comprising:
a first tool body portion having a first aperture for receiving the cable therethrough,
a second tool body portion having a second aperture for receiving the cable therethrough, the first and second tool body portions being rotatably connected to one another to form a joint allowing each tool body portion to rotate relative to the other about a pivot axis that passes through the first and second apertures, wherein the second tool body portion supports a rotatable spool defining a spooling axis of rotation, said spool for receiving and spooling the end of a selected conductor of the cable;
a motor and associated mechanical power transmission system carried by said second tool body portion for driving said spool about said spooling axis;
a power source for powering said motor; and
a control mechanism carried by said first tool body portion for controllably coupling said power source to said motor.

2. The tool of claim 1, wherein said motor is an electric motor, wherein said power source is a source of electricity, and wherein said control mechanism is an electric switch, the tool further comprising an electrical power transmission system for transmitting electrical power, from said power source, between said first tool body portion and said second tool body portion, through said joint.

3. The tool of claim 2, wherein said power source is carried by said first tool body portion.

4. The tool of claim 3, wherein said electrical power transmission system is adapted to make electrical contact between said first and second tool body portions by friction between either or both (a) respective electrically conductive portions of said first and second tool body portions, or (b) respective electrically conductive elements attached to said first and second tool body portions.

5. The tool of claim 4, wherein said joint allows for relative rotation of said first and second tool body portions exceeding 360 degrees.

6. The tool of claim 4, wherein the first aperture has a maximum projected area along a first aperture axis, the second aperture has a maximum projected area along a second aperture axis, and the first aperture axis, the second aperture axis, and the pivot axis are all substantially coincident.

7. The tool of claim 3, wherein said joint allows for relative rotation of said first and second tool body portions exceeding 360 degrees.

8. The tool of claim 3, wherein the first aperture has a maximum projected area along a first aperture axis, the second aperture has a maximum projected area along a second aperture axis, and the first aperture axis, the second aperture axis, and the pivot axis are all substantially coincident.

9. The tool of claim 2, wherein said electrical power transmission system is adapted to make electrical contact between said first and second tool body portions by friction between either or both (a) respective electrically conductive portions of said first and second tool body portions, or (b) respective electrically conductive elements attached to said first and second tool body portions.

10. The tool of claim 9, wherein the spooling axis is angled between about 10 and 20 degrees relative to a plane perpendicular to the pivot axis.

11. The tool of claim 10, wherein said joint allows for relative rotation of said first and second tool body portions exceeding 360 degrees.

12. The tool of claim 9, wherein said joint allows for relative rotation of said first and second tool body portions exceeding 360 degrees.

13. The tool of claim 2, wherein the spooling axis is angled between about 10 and 20 degrees relative to a plane perpendicular to the pivot axis.

14. The tool of claim 13, wherein said joint allows for relative rotation of said first and second tool body portions exceeding 360 degrees.

15. The tool of claim 2, wherein said joint allows for relative rotation of said first and second tool body portions exceeding 360 degrees.

16. The tool of claim 2, wherein the first aperture has a maximum projected area along a first aperture axis, the second aperture has a maximum projected area along a second aperture axis, and the first aperture axis, the second aperture axis, and the pivot axis are all substantially coincident.

17. The tool of claim 1, wherein the spooling axis is angled between about 10 and 20 degrees relative to a plane perpendicular to the pivot axis.

18. The tool of claim 17, wherein said joint allows for relative rotation of said first and second tool body portions exceeding 360 degrees.

19. The tool of claim 1, wherein said joint allows for relative rotation of said first and second tool body portions exceeding 360 degrees.

20. The tool of claim 1, wherein the first aperture has a maximum projected area along a first aperture axis, the second aperture has a maximum projected area along a second aperture axis, and the first aperture axis, the second aperture axis, and the pivot axis are all substantially coincident.

* * * * *